(12) United States Patent
Yang et al.

(10) Patent No.: US 7,929,282 B2
(45) Date of Patent: Apr. 19, 2011

(54) KEYBOARD

(75) Inventors: Xin Yang, Shenzhen (CN); Wei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 31 days.

(21) Appl. No.: 12/493,246

(22) Filed: Jun. 29, 2009

(65) Prior Publication Data
US 2010/0039759 A1 Feb. 18, 2010

(30) Foreign Application Priority Data
Aug. 15, 2008 (CN) .......................... 2008 1 0303850

(51) Int. Cl.
*H05K 5/00* (2006.01)
*H05K 7/00* (2006.01)
*B41J 11/62* (2006.01)
*G06F 3/033* (2006.01)
*G06F 3/041* (2006.01)
*G06F 3/045* (2006.01)
*G09G 5/00* (2006.01)

(52) U.S. Cl. .............. 361/679.08; 361/679.18; 345/163; 345/168; 400/714

(58) Field of Classification Search ............. 361/679.08, 361/679.18; 345/163, 168; 400/714
See application file for complete search history.

(56) References Cited

U.S. PATENT DOCUMENTS

| | | | |
|---|---|---|---|
| 6,388,660 B1 * | 5/2002 | Manser et al. ................ | 345/173 |
| 6,798,399 B2 * | 9/2004 | Hatanaka ....................... | 345/168 |
| 7,068,499 B2 * | 6/2006 | Aisenberg ................ | 361/679.56 |

* cited by examiner

*Primary Examiner* — Jayprakash N Gandhi
*Assistant Examiner* — Anthony M Haughton
(74) *Attorney, Agent, or Firm* — Zhigang Ma

(57) ABSTRACT

A keyboard is provided. The keyboard includes a main body, a numerical keypad, and a touchpad. A receiving space is defined on the main body for receiving the numerical keypad and the touchpad. The numerical keypad is pivotally attached to a first sidewall of the receiving space, and the touchpad is pivotally attached to a second sidewall of the receiving space.

7 Claims, 9 Drawing Sheets

KEYBOARD

BACKGROUND

1. Technical Field

The disclosure relates to keyboards, and particularly, to a computer keyboard.

2. Description of Related Art

When people operate computers, they usually use a keyboard to input characters, and a mouse to control the movement of a displayed cursor. When a computer with a display, a keyboard, and a mouse is put on a small desk, there might not be enough space on the desk for a user to maneuver the mouse.

BRIEF DESCRIPTION OF THE DRAWINGS

The components of the drawings are not necessarily drawn to scale, the emphasis instead being placed upon clearly illustrating the principles of a keyboard. Moreover, in the drawings, like reference numerals designate corresponding parts throughout several views.

DETAILED DESCRIPTION

Figure 1:
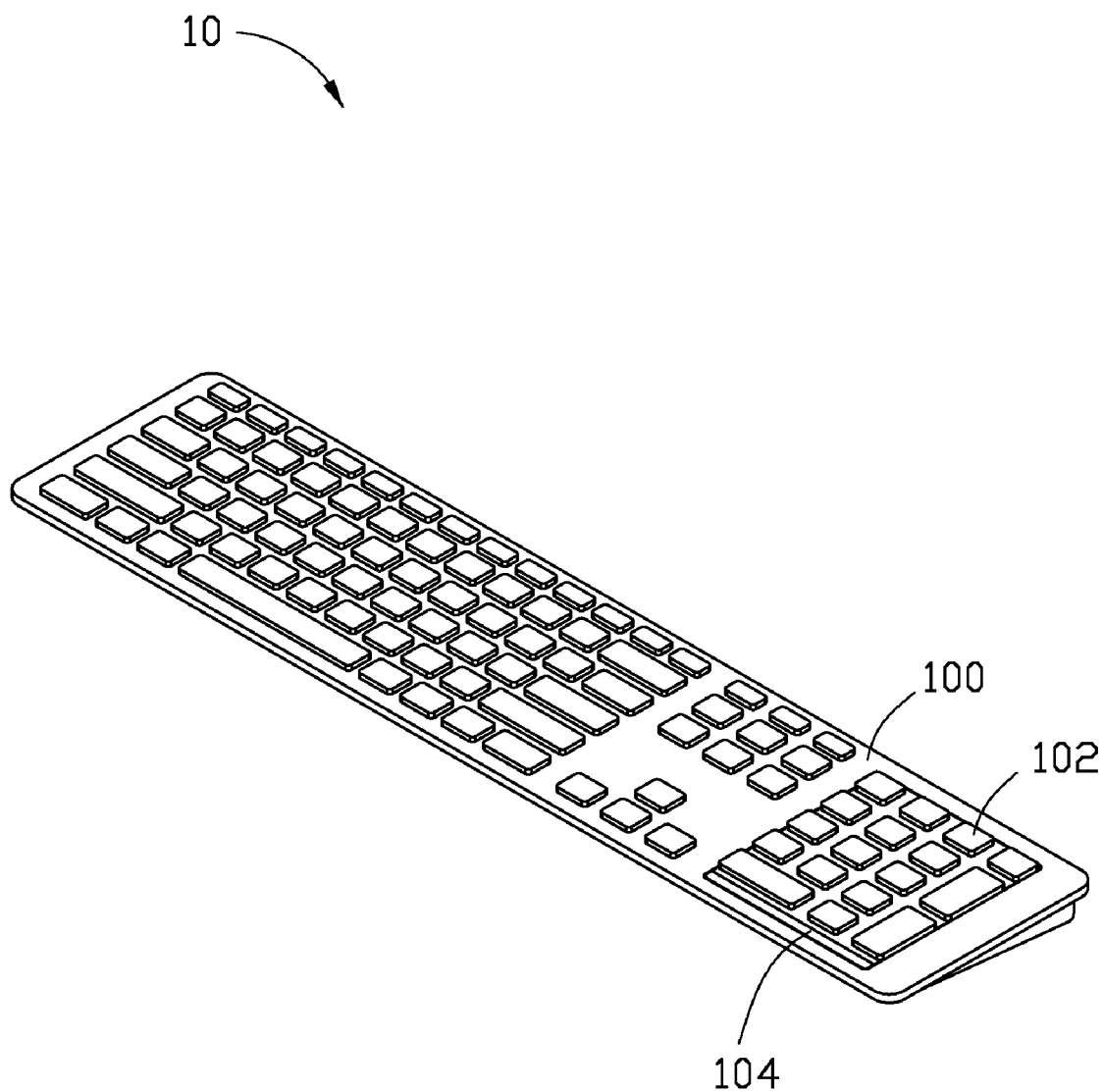
FIG. 1 is an isometric view of a keyboard in accordance with an exemplary embodiment.

FIG. 1 is an isometric view of a keyboard 10 in accordance with an exemplary embodiment. The keyboard 10 is a computer keyboard. The keyboard 10 includes a main body 100 with a plurality of buttons arranged on the main body 100 and a numerical keypad 102 located on the right of the keyboard 10.

Figure 2:
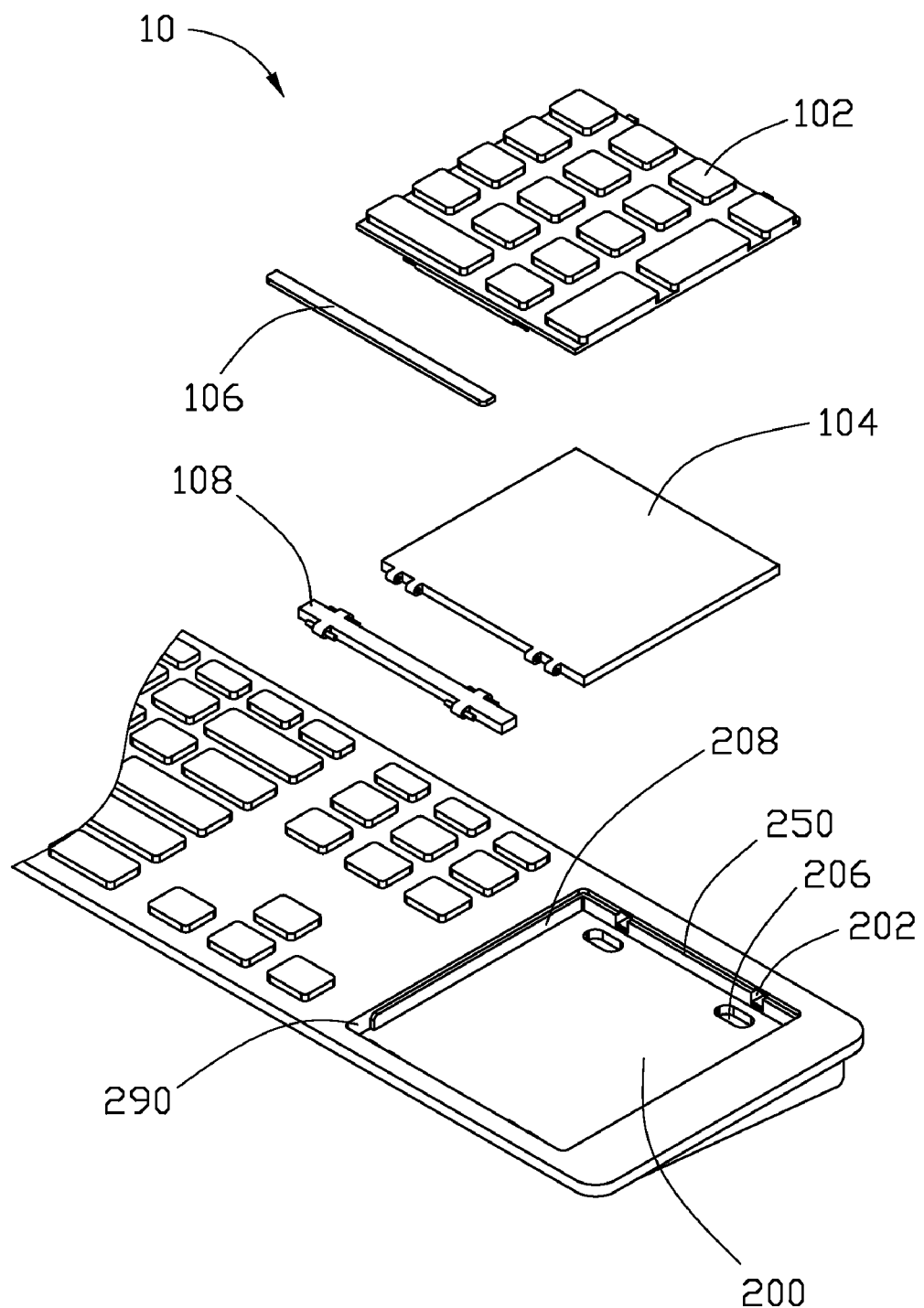
FIG. 2 is a partial, exploded, perspective view of the keyboard of FIG. 1.
Figure 3:
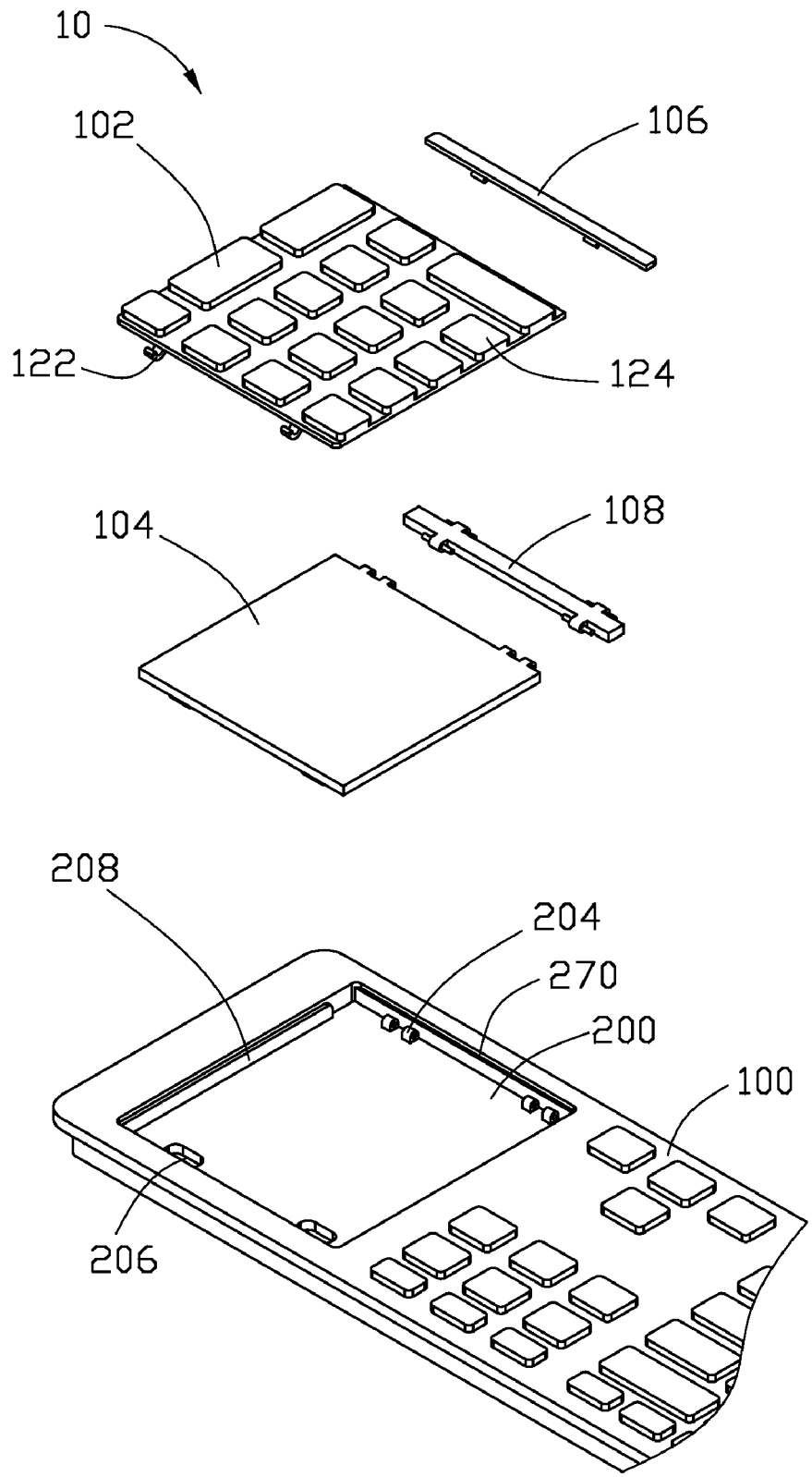
FIG. 3 is a partial, exploded, perspective view of the keyboard of FIG. 2, viewed from another orientation.

Referring to FIG. 2 and FIG. 3, a receiving space 200 is defined on the right of the keyboard 10 for receiving both the numerical keypad 102 and a touchpad 104. In the exemplary embodiment, the receiving space 200, the numerical keypad 102, and the touchpad 104 are generally square. Two rotary grooves 202 are defined on a first sidewall 250 of the receiving space 200 for receiving two rotary hooks 122 on one side of the numerical keypad 102, such that the numerical keypad 102 is rotatable after the rotary hooks 122 are engaged in the receiving space 200 via the two rotary grooves 202. The sidewall of the numerical keypad 102 opposite to the rotary hooks 122 is pivotally attached to a flip bar 106. The flip bar 106 is an extension of the numerical keypad 102 and can be rotated to be perpendicular to a bottom surface of the numerical keypad 102.

The touchpad 104 is pivotally attached to a second sidewall 270 of the receiving space 200 that is opposite to the first sidewall 250 via a rotary bar 108. The second sidewall 270 includes two pairs of rotary seats 204. One sidewall of the rotary bar 108 is pivotally attached to the touchpad 104, and the opposite sidewall is pivotally attached to the rotary seats 204.

Two support ribs 208 are mounted on sidewalls 290 of the receiving space 200 that is adjacent to the sidewalls 250 and 270. The support ribs 208 are used for supporting the numerical keypad 102 when the numerical keypad 102 is received in the receiving space 200. Two receiving grooves 206 are defined on the bottom surface of the receiving space 200, for receiving two projection portions 142 (see FIG. 9) fixed on the bottom surface of the touchpad 104 when the touchpad 104 is received in the receiving space 200.

Figure 4:
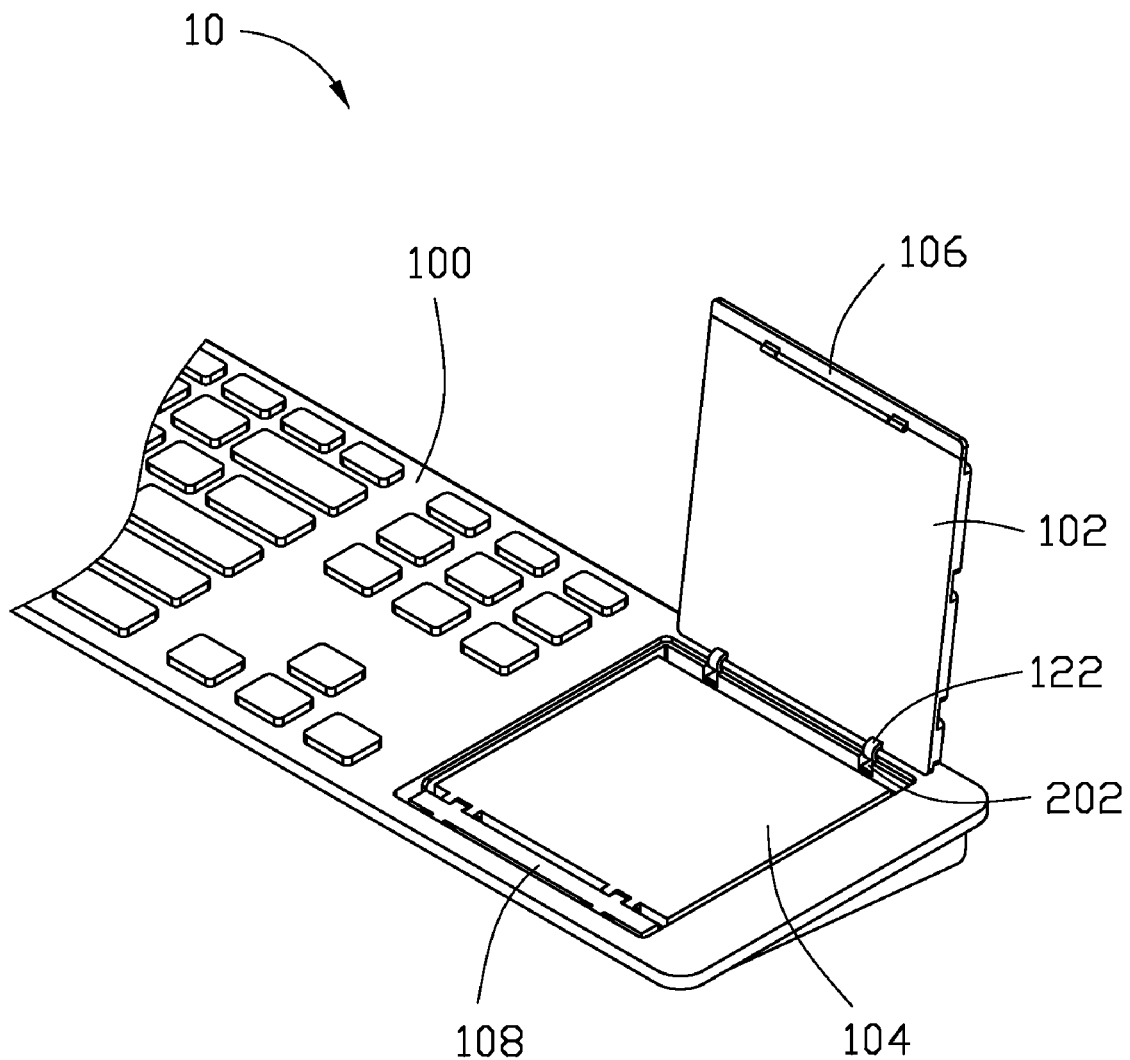
FIG. 4 is an isometric view of the keyboard of FIG. 1, with a numerical keypad rotated from its original position.

Referring to FIGS. 4-9, in FIG. 4, the numerical keypad 102 is rotated out from the receiving space 200, and the touchpad 104 is received in the receiving space 200.

Figure 5:
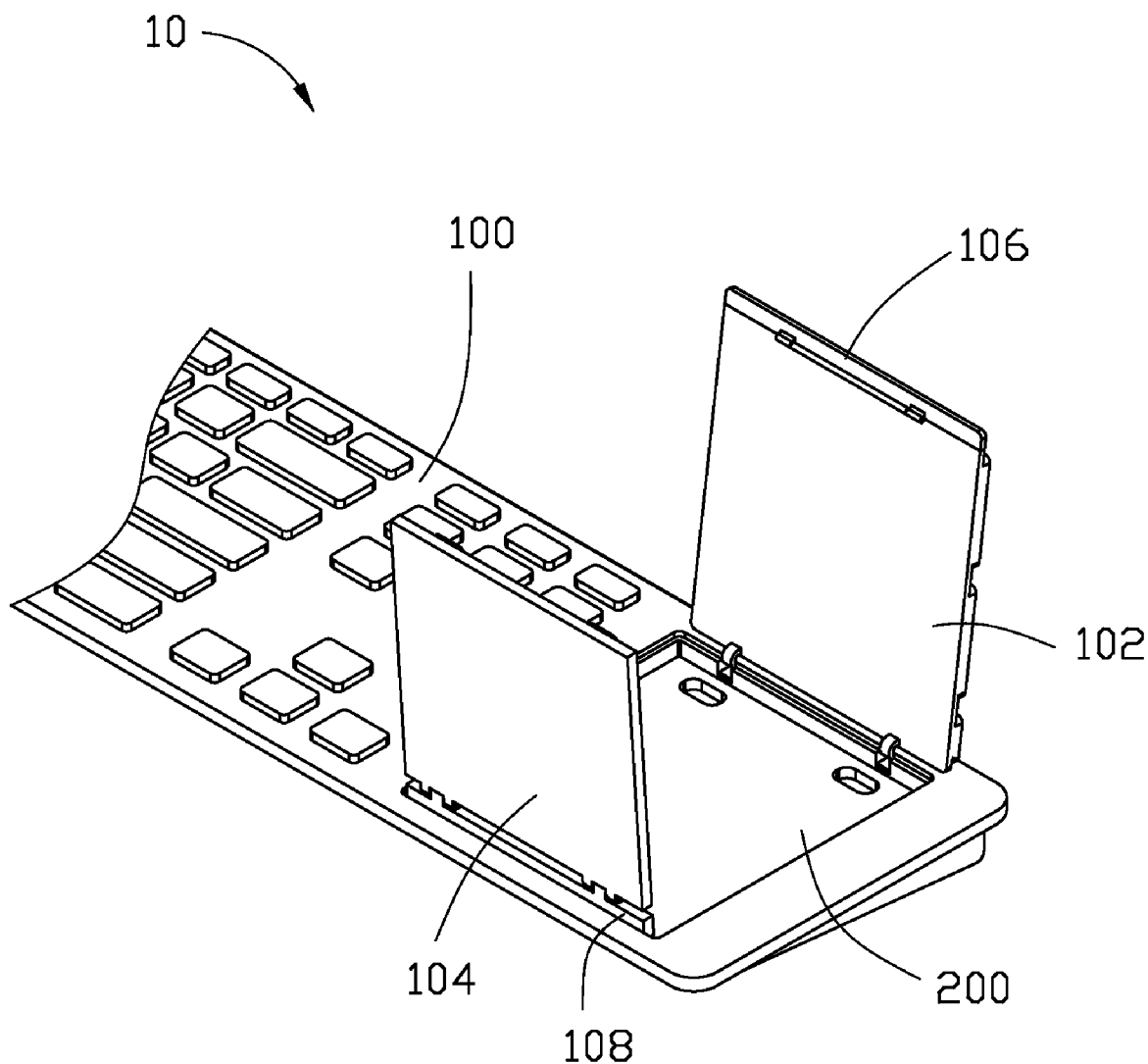
FIG. 5 is a perspective view of the keyboard of FIG. 1, with a touchpad rotated opposite to the numerical keypad.

In FIG. 5, the touchpad 104 is also rotated out from the receiving space 200.

Figure 6:
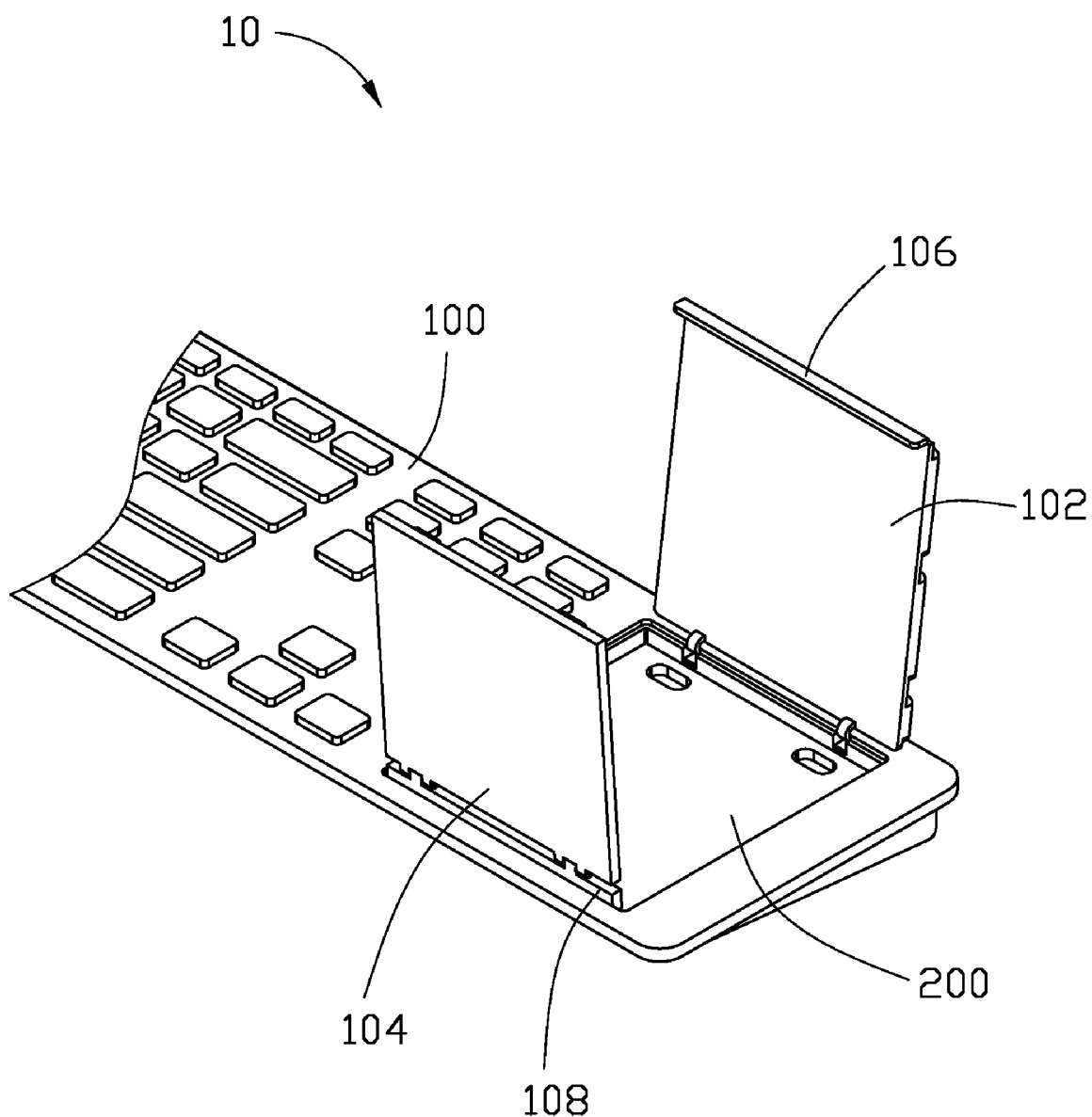
FIG. 6 is a perspective view of the keyboard of FIG. 1, slightly different from FIG. 5.
Figure 7:
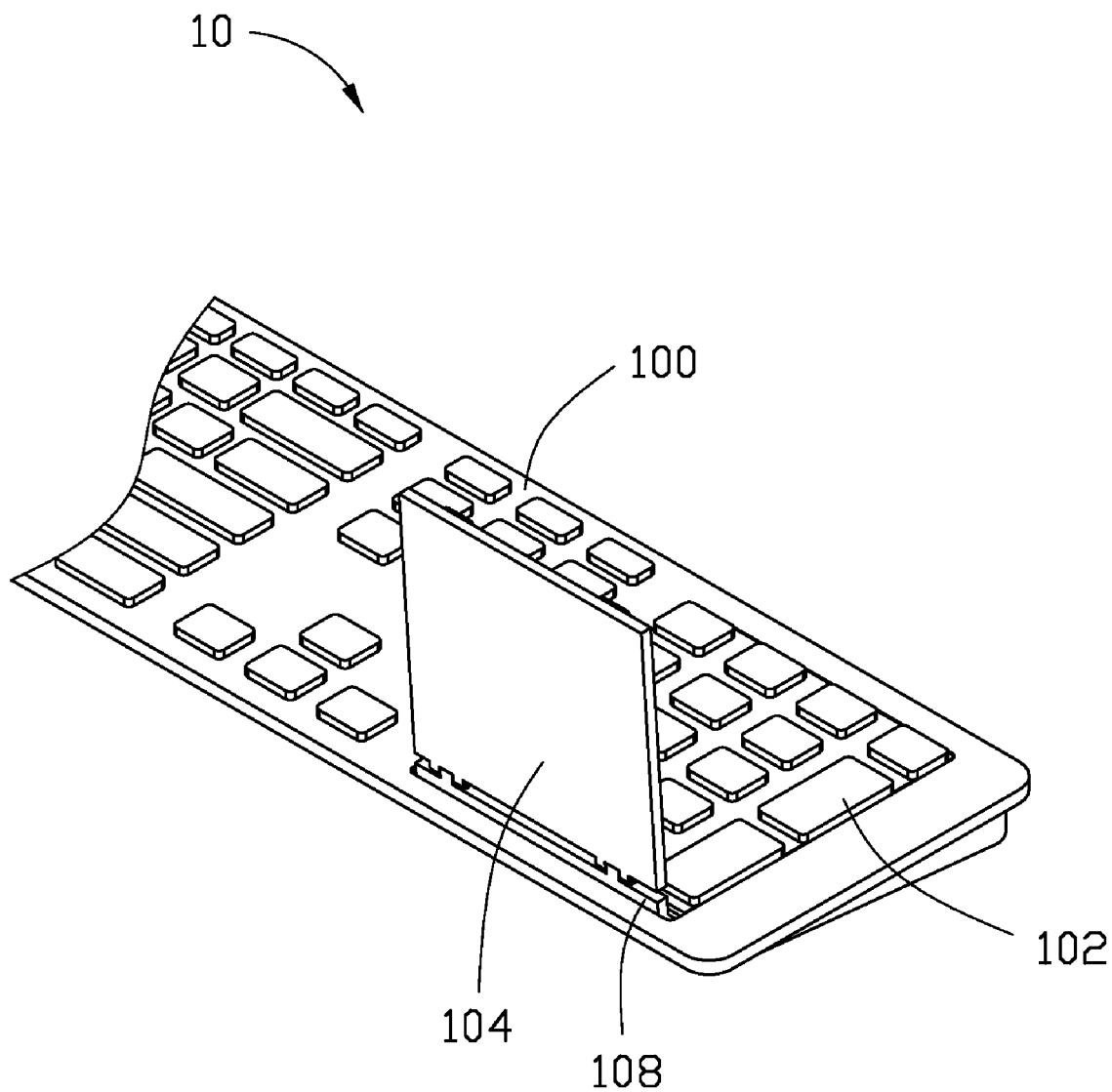
FIG. 7 is a perspective view of the keyboard of FIG. 1, with the numerical keypad being laid down and the touchpad rotated from its original position.

In FIG. 6, the flip bar 106 is rotated to be perpendicular to the bottom surface of the numerical keypad 102. With the flip bar 106 being perpendicular to the rear of the numerical keypad 102, in FIG. 7, the numerical keypad 102 can be received in the receiving space 200 while the touchpad 104 has been rotated out from the receiving space 200.

Figure 8:
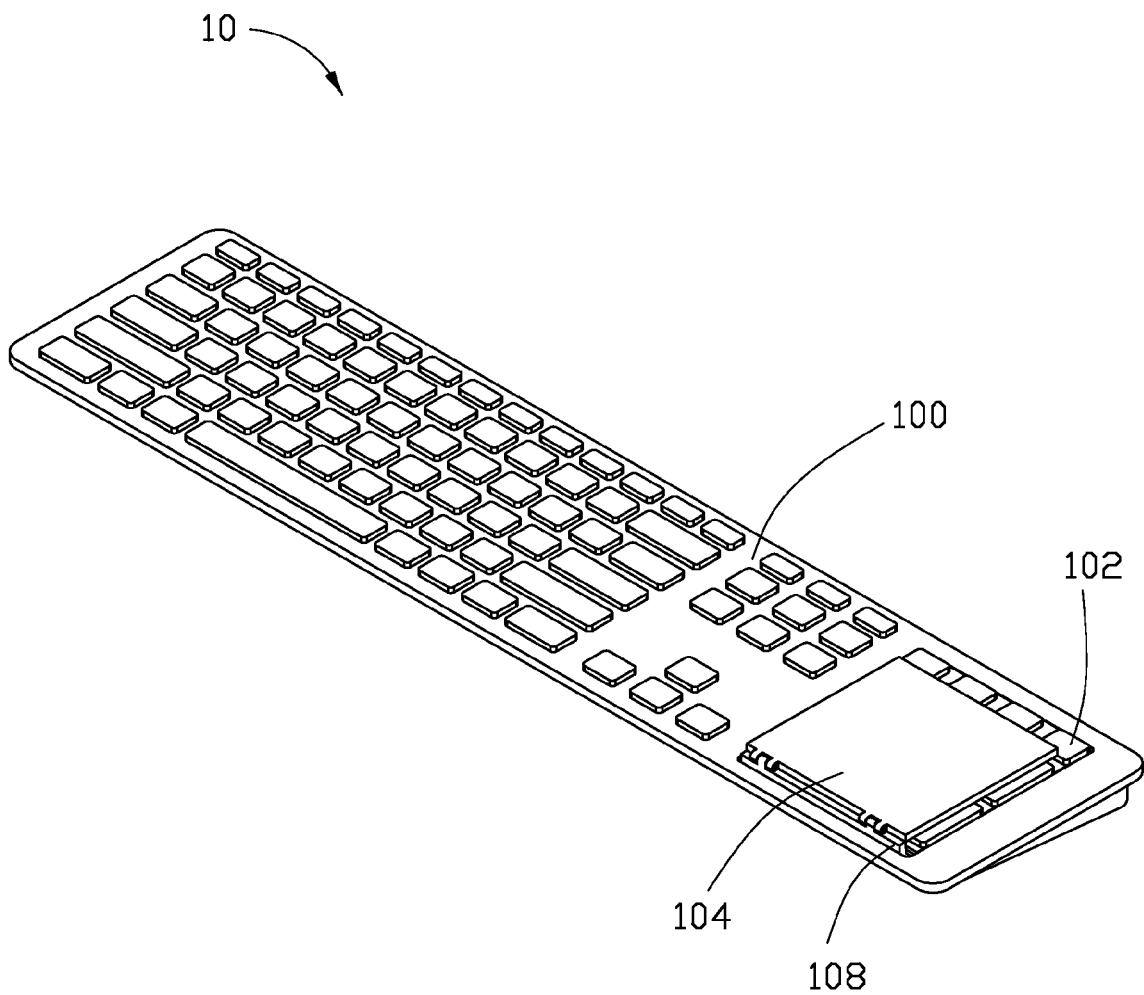
FIG. 8 is a perspective view of the keyboard of FIG. 1, with the touchpad being laid over the numerical keypad.
Figure 9:
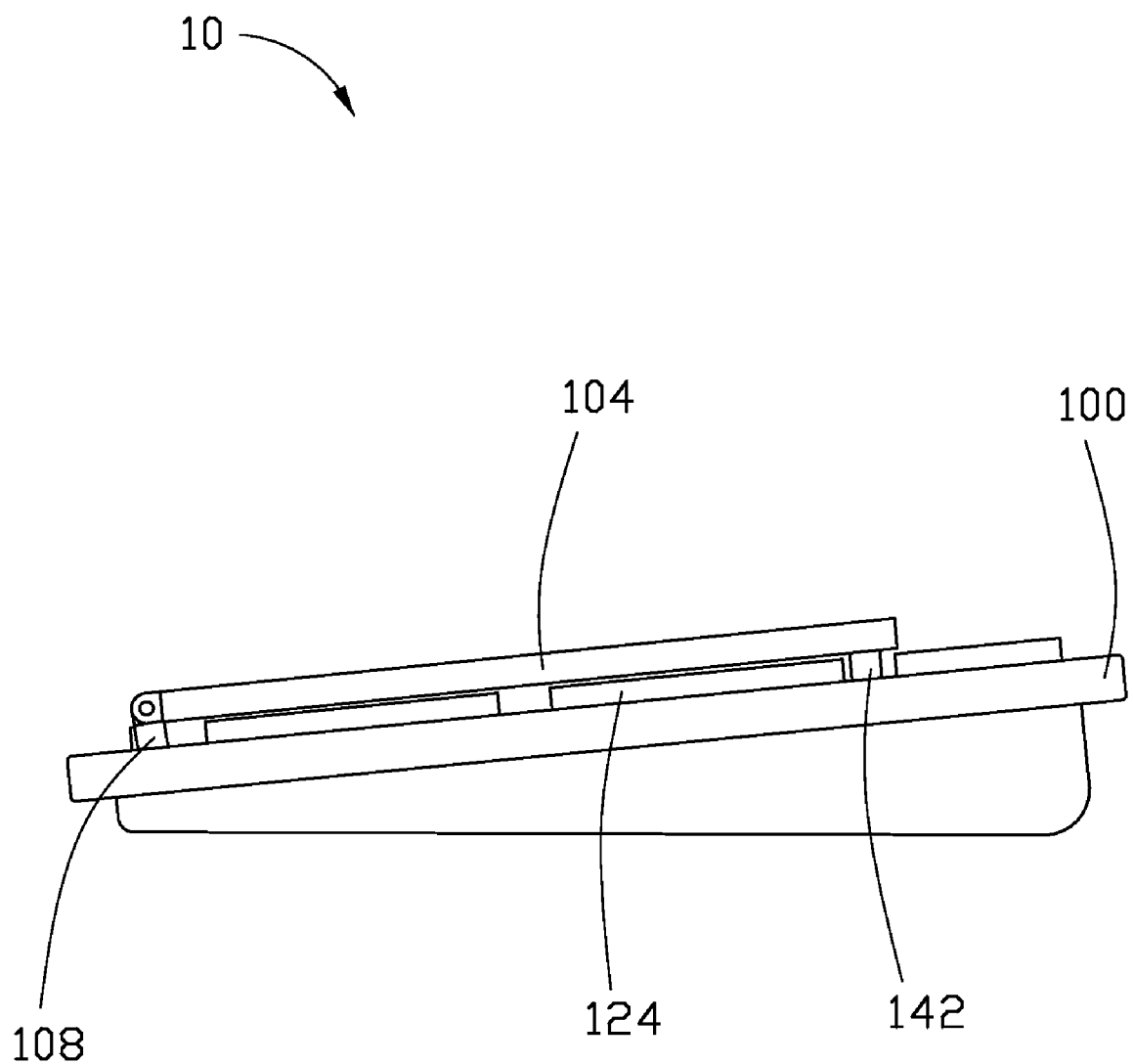
FIG. 9 is a right side view of the keyboard of FIG. 8.

In FIGS. 8 and 9, the touchpad 104 is laid over the numerical keypad 102, and can perform the functions of a mouse. The two projection portions 142 are received in the interspaces among buttons 124 of the numerical keypad 102. The two projection portions 142 support the touchpad 104 and prevent the touchpad 104 from contacting the buttons 124.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A keyboard comprising:
    a main body;
    a numerical keypad; and
    a touchpad;
    wherein a receiving space is defined on the main body for receiving the numerical keypad and the touchpad, the numerical keypad is pivotally attached to a first sidewall of the receiving space, and the touchpad is pivotally attached to a second sidewall of the receiving space, the numerical keypad and the touchpad are respectively able to be rotated out of the receiving space and rotated to be received in the receiving space.

2. The keyboard as described in claim 1, further comprising a flip bar, wherein the flip bar is an extension of the numerical keypad, and when the numerical keypad is received in the receiving space, the flip bar is rotated to be perpendicular to the bottom surface of the numerical keypad.

3. The keyboard as described in claim 1, further comprising a rotary bar, wherein one sidewall of the rotary bar is pivotally attached to the touchpad, and the opposite sidewall is pivotally attached to the second sidewall.

4. The keyboard as described in claim 1, further comprising two support ribs, wherein the two support ribs are respectively mounted on sidewalls of the receiving space adjacent to the first sidewall and the second sidewall, and the two support ribs are for supporting the numerical keypad when the numerical keypad is received in the receiving space.

5. The keyboard as described in claim 1, wherein at least one receiving groove is defined on the bottom surface of the receiving space, at least one projection portion is fixed on the bottom surface of the touchpad, and the at least one projection portion is received in the at least one receiving groove when the touchpad is received in the receiving space.

6. The keyboard as described in claim 1, wherein the first sidewall is opposite to the second sidewall.

7. The keyboard as described in claim 1, wherein the receiving space, the numerical keypad, and the touchpad are square.

\* \* \* \* \*